US006949746B2

United States Patent
Stierstorfer

(10) Patent No.: US 6,949,746 B2
(45) Date of Patent: Sep. 27, 2005

(54) METHOD FOR CORRECTING ERRORS ARISING IN AN X-RAY DETECTOR OWING TO TIME-DELAYED SIGNAL REPRODUCTIONS

(75) Inventor: Karl Stierstorfer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/840,376

(22) Filed: May 7, 2004

(65) Prior Publication Data
US 2004/0267507 A1 Dec. 30, 2004

(30) Foreign Application Priority Data
May 9, 2003 (DE) .......................... 103 20 972

(51) Int. Cl.[7] .................................................. G01T 1/24
(52) U.S. Cl. ................................................... 250/336.1
(58) Field of Search .............................. 250/336.1, 393, 250/394; 378/19, 98.8

(56) References Cited

U.S. PATENT DOCUMENTS

| 4,861,994 A | | 8/1989 | Saotome et al. |
| 5,847,395 A | * | 12/1998 | Malmin et al. ........ 250/363.07 |
| 2002/0121603 A1 | | 9/2002 | Wong et al. |

* cited by examiner

Primary Examiner—David Porta
Assistant Examiner—Marcus Taningco
(74) Attorney, Agent, or Firm—Harness, Dickey & Pierce P.L.C.

(57) ABSTRACT

A method is for correcting errors arising in an X-ray detector owing to an afterglow. An actual intensity $I_n$ is determined at an instant n by subtracting a subtrahend from a measured output signal at the instant n, wherein the subtrahend is determined from a number of output signals measured before the instant n.

22 Claims, 1 Drawing Sheet

METHOD FOR CORRECTING ERRORS ARISING IN AN X-RAY DETECTOR OWING TO TIME-DELAYED SIGNAL REPRODUCTIONS

The present application hereby claims priority under 35 U.S.C. §119 on German patent application number DE 103 20 972.7 filed May 9, 2003, the entire contents of which are hereby incorporated herein by reference.

FIELD OF THE INVENTION

The invention generally relates to a method for correcting errors arising in X-ray detectors owing to time-delayed signal reproductions. It also generally relates to an X-ray detector, preferably one suitable for carrying out the method.

BACKGROUND OF THE INVENTION

X-ray detectors that have a multiplicity of individual detector elements arranged on a surface are used in X-ray computed tomography. Each of the detector elements is provided on its side facing the X-ray source with a scintillator that is mounted on a photodiode. X-radiation impinging on the detector element is absorbed in the scintillator. The absorbed X-radiation is converted into light. The intensity of the light is a measure of the X-ray intensity. It is measured by use of the photodiode.

Particularly in the case of X-ray computed tomography, the X-ray intensities measured by the X-ray detectors are interrogated at very short time intervals of from 400 μsec to 30 msec and stored. Suitable algorithms are used to make a final calculation of the image from the intensity distributions measured by the X-ray detector. Aside from the measurement at the initial instant, the X-ray detector indicates excessively high X-ray intensities during the further measurement process. An X-ray intensity detected during the further measurement process is composed of the X-ray intensity actually caused at the instant of measurement by the absorbed X-radiation and a further X-ray intensity that was caused by an afterglow, owing to the material, of X-radiation previously irradiated onto the X-ray detector.

It is evident that the error owing to the afterglow is propagated during the measurement of the X-ray intensities and leads to errors in the calculation of the image.

Semiconductor detectors can also be used to measure X-ray intensities. In this case, an incident X-ray intensity is converted directly, that is to say without using a scintillator, into a voltage signal or charge signal. Such semiconductor detectors also have a time-delayed signal reproduction comparable to the afterglow of scintillators. An X-ray intensity incident at an instant t effects an electrical signal decreasing with time. Consequently, errors arise here also when calculating the image.

SUMMARY OF THE INVENTION

It is an object of an embodiment of the invention to lessen or even remove at least one of the disadvantages of the prior art. In particular, a method and an X-ray detector are used to determine images through calculation, and to produce them as exactly as possible.

According to an embodiment of the invention, a method is preferably provided for correcting errors arising in an X-ray detector owing to time-delayed signal reproductions in accordance with the following relationship.

$$I_n = O_n - \sum_k \lambda_k L_{n-1}^k, \qquad (1)$$

where it holds that:

$$L_0^k = 0; \; k=1 \ldots K, \qquad (2)$$

$$L_n^k = (1-\lambda_k)L_{n-1}^k + \mu_k I_n; \; k=1 \ldots K \qquad (3)$$

A time-delayed signal reproduction is understood to be a general decay of a signal. In a sequential measurement of a multiplicity of signals, each measured signal includes a component that is caused by the decay of the signal of the preceding measurement or of the signals of the preceding measurements. If the measured output signal $O_n$ is known at the instant n, the actual intensity $I_n$ can be determined recursively in accordance with the equation (1).

In equation (1), the signal component owing to the signal delays of preceding measurements is subtracted by the subtrahend. The method according to an embodiment of the invention assumes that a portion of an intensity $I_n$ measured at the instant n is a constituent of the result of later measurement results in accordance with the coefficient $\mu_k$. $\mu_k$ describes the decrease in the intensity $I_n$ observed at the instant n. The material-specific delay of the signal reproduction of the scintillator material or of the semiconductor is described by $\lambda_k$.

Equation (2) reproduces the initial condition. The X-ray detector exhibits no signal delay at the instant n=0. The intensity In is updated using equation (3).

In the case of a detector array, the method is executed with reference in particular to a single pixel.

According to an advantageous refinement, the correction is performed in accordance with the following relationship:

$$I_n = (O_n - \sum_k \lambda_k L_{n-1}^k)/(1 - \mu_{tot}) \qquad (4)$$

$\mu_{tot}$ is the sum of the $\mu_k$.

A weighted correction is made in this case. This simplifies the correction of the signal overall. The proposed correction of the signal delay is particularly precise.

According to a further measure of an embodiment of the invention, an X-ray detector is provided with a device for carrying out the above method. For this purpose, the X-ray detector can include, for example, a microcontroller that automatically carries out, as a function of the characteristic of the detector elements used, a correction of the signal delay, in particular of the afterglow, using the method according to an embodiment of the invention. Such an X-ray detector already supplies corrected signals. The programming of such a microcontroller included in an X-ray detector is within the abilities of a person skilled in the art and requires no further explanation. It is the charge signals or voltage signals measured at the instant of the measurement by means of a detector element that are corrected, in particular.

BRIEF DESCRIPTION OF THE DRAWINGS

The present invention will become more fully understood from the detailed description of preferred exemplary embodiments given hereinbelow and the accompanying drawing, which is given by way of illustration only and thus are not limitative of the present invention, and wherein.

DETAILED DESCRIPTION OF THE PREFERRED EMBODIMENTS

The method according to an embodiment of the invention is based on the following model:

$$L_0^k = 0; k=1 \ldots K \quad (5)$$

$$O_n = I_n(1 - \mu_{tot}) + \sum_k \lambda_k L_{n-1}^k \quad (6)$$

$$L_n^k = (1-\lambda_k)L_{n-1}^k + \mu_k I_n; k=1 \ldots K \quad (7)$$

Equations (6) and (7) are to be executed recursively for each instant n. Here, $L_{n-1}^k$ is the delayed intensity relating to the component k at the instant n, $I_n$ is the nth input signal and $O_n$ is the nth output signal. $\mu_{tot}$ is the sum of the $\mu_k$. Equation (5) describes the initial condition: the delay reservoir is empty at the beginning. Equation (6) describes the output signal $O_n$ as the sum of the actual intensity $I_n$ and the magnitudes of the delayed intensities. Equation (7) updates the delayed intensity.

Figure 1:
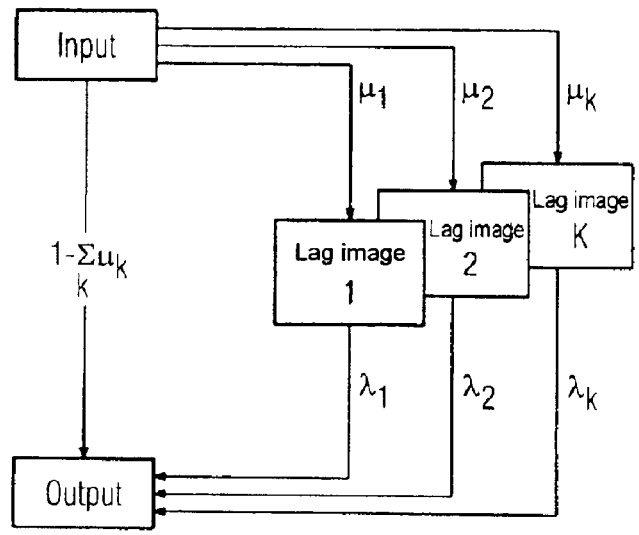
FIG. 1 shows a flowchart of the model on which the method is based.

The model is shown in FIG. 1 schematically with the aid of a flowchart. An actual intensity, denoted by "output", is composed of the measured intensity, denoted by "input", and further residual intensities, denoted by "lag image 1 . . . k" and owing to the decay of preceding intensities, that are added to the value of the actual intensity "output". The measured intensity "input" is greater than the actual intensity "output".

A portion of the measured intensity "input" is fed into the various residual intensities in accordance with the coefficients $\mu_k$. The residual intensities are taken into account in accordance with the coefficients $\lambda_k$ when calculating the actual intensity "output". Various time constants can be taken into account using the proposed model.

Figure 2:
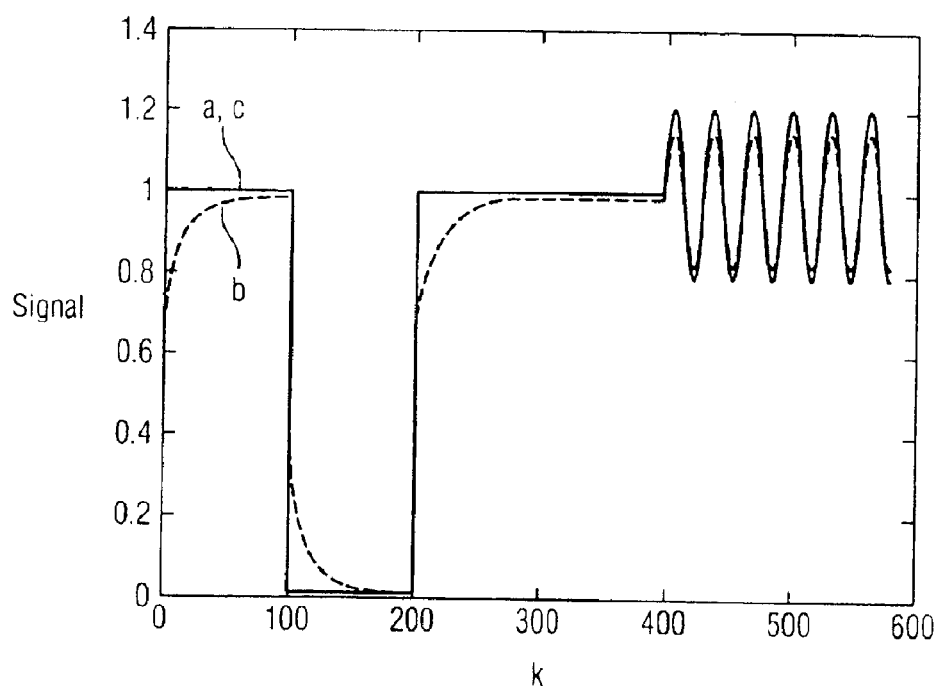
FIG. 2 shows measured and reconstructed signal intensities plotted against k.

If the proposed method is applied in the field of X-ray computed tomography, it is possible to execute the method on raw data, or else at a later point in time when converting the signals (raw data) supplied by the X-ray detector into an image. It is possible, for example, not to carry it out until during or after the image reconstruction. The result of a computational trial of the proposed correction of signal delay is shown in FIG. 2. An input signal denoted by a is shown there plotted against time. A measured output signal is denoted by b. The reconstructed signal is denoted by c. It is in complete agreement with the input signal a. This shows that the method according to an embodiment of the invention achieves a complete correction of the afterglow in X-ray detectors, in particular.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for correcting errors arising in an X-ray detector owing to time-delayed signal reproductions, comprising:
   determining an actual intensity at an instant n by subtracting a subtrahend from a measured output signal at the instant n, wherein the subtrahend is determined from a number of output signals measured before the instant n.

2. The method as claimed in claim 1, wherein each actual intensity is determined at the instant n in a recursive fashion from at least one of earlier intensities and signals.

3. The method as claimed in claim 1, wherein error correction is executed in accordance with the following relationship:

$$I_n = O_n - \sum_k \lambda_k L_{n-1}^k, \quad (1)$$

where it holds that:

$$L_0^k = 0; k=1 \ldots K, \quad (2)$$

$$L_n^k = (1-\lambda_k)L_{n-1}^k + \mu_k I_n; k=1 \ldots K \quad (3)$$

and wherein $L_{n-1}^k$ is a delayed intensity relating to the component k at the instant n, $I_n$ is the nth input signal and $O_n$ is the nth output signal.

4. The method as claimed in claim 1, wherein error correction is carried out in accordance with the following relationship:

$$I_n = (O_n - \sum_k \lambda_k L_{n-1}^k)/(1 - \mu_{tot}) \quad (4)$$

and wherein $L_{n-1}^k$ is a delayed intensity relating to the component k at the instant n, $I_n$ is the nth input signal, $O_n$ is the nth output signal and $\mu_{tot}$ is the sum of the $\mu_k$.

5. An X-ray detector having a device for carrying out the method in accordance with claim 1.

6. A computed tomography unit having an X-ray detector as claimed in claim 5.

7. The computed tomography unit as claimed in claim 6, wherein the device is at least partially fitted on a rotating part of a gantry.

8. The computed tomography unit as claimed in claim 7, wherein the device is formed by an integrated circuit assigned separately to each detector pixel.

9. The method as claimed in claim 1, wherein the method is for correcting errors arising in an X-ray detector owing to afterglow.

10. The method as claimed in claim 2, wherein error correction is executed in accordance with the following relationship:

$$I_n = O_n - \sum_k \lambda_k L_{n-1}^k, \quad (1)$$

where it holds that:

$$L_0^k = 0; k=1 \ldots K, \quad (2)$$

$$L_n^k = (1-\lambda_k)L_{n-1}^k + \mu_k I_n; k=1 \ldots K \quad (3)$$

and wherein $L_{n-1}^k$ is a delayed intensity relating to the component k at the instant n, $I_n$ is the nth input signal and $O_n$ is the nth output signal.

11. An X-ray detector, comprising:
   a device for determining an actual intensity of a signal at an instant n by subtracting a subtrahend from a measured output signal at the instant n, wherein the subtrahend is determined from a number of output signals measured before the instant n.

12. A computed tomography unit including the X-ray detector as claimed in claim 11.

13. The computed tomography unit as claimed in claim 12, wherein the device is at least partially fitted on a rotating part of a gantry.

14. The computed tomography unit as claimed in claim 12, wherein the device is formed by an integrated circuit assigned separately to each detector pixel.

15. The computed tomography unit as claimed in claim 13, wherein the device is formed by an integrated circuit assigned separately to each detector pixel.

16. An X-ray detector, comprising:

means for detecting an x-ray signal; and means for determining an actual intensity of a signal at an instant n by subtracting a subtrahend from a measured output signal at the instant n, wherein the subtrahend is determined from a number of output signals measured before the instant n.

17. A computed tomography unit including the X-ray detector as claimed in claim 16.

18. The computed tomography unit as claimed in claim 17, wherein the means for determining is at least partially fitted on a rotating part of a gantry.

19. The computed tomography unit as claimed in claim 17, wherein the device is formed by an integrated circuit assigned separately to each detector pixel.

20. The computed tomography unit of claim 17, further comprising:

means for converting the signal supplied by the X-ray detector into an image.

21. The computed tomography unit of claim 20, wherein the means for determining determines an actual intensity after image reconstruction.

22. The computed tomography unit of claim 20, wherein the means for determining determines an actual intensity before image reconstruction.

* * * * *